(12) United States Patent
Yamanaka et al.

(10) Patent No.: US 6,900,723 B2
(45) Date of Patent: May 31, 2005

(54) ANTI-THEFT SYSTEM FOR VEHICLES

(75) Inventors: Tadamasa Yamanaka, Kawagoe (JP);
Masahiro Odashima, Kawagoe (JP);
Koji Sakuma, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/929,286

(22) Filed: Aug. 15, 2001

(65) Prior Publication Data

US 2002/0027501 A1 Mar. 7, 2002

(30) Foreign Application Priority Data

Aug. 15, 2000 (JP) ......................................... 2000-246254

(51) Int. Cl.$^7$ .............................................. B60R 25/10
(52) U.S. Cl. .............................. 340/426.1; 340/426.11; 340/426.12; 340/425.5; 307/10.2
(58) Field of Search ............................. 340/426, 425.5, 340/463, 438, 426.1, 426.11, 426.12, 539.1, 539.16, 539.18, 539.19; 307/10.2, 10.3, 10.4, 10.5; 180/287, 167; 379/39, 37

(56) References Cited

U.S. PATENT DOCUMENTS

| | | | | |
|---|---|---|---|---|
| 5,223,844 A | * | 6/1993 | Mansell et al. | 342/357.07 |
| 5,276,728 A | * | 1/1994 | Pagliaroli et al. | 379/58 |
| 5,623,245 A | * | 4/1997 | Gilmore | 340/426 |
| 5,805,057 A | * | 9/1998 | Eslaminovin | 340/426 |
| 5,926,086 A | | 7/1999 | Escareno et al. | |
| 6,046,687 A | * | 4/2000 | Janky | 340/988 |

FOREIGN PATENT DOCUMENTS

| | | |
|---|---|---|
| DE | 94 06 605.1 U1 | 9/1994 |
| DE | 195 08 369 C1 | 3/1996 |
| DE | 299 19 641 U1 | 4/2000 |

* cited by examiner

*Primary Examiner*—Anh V. La
(74) *Attorney, Agent, or Firm*—Sughrue Mion, PLLC

(57) ABSTRACT

An object is to provide an anti-theft system for vehicles which is easy to operate and is capable of returning a stolen vehicle to its owner. A stolen vehicle is remote-controlled so as to make it impossible to restart an engine in response to a vehicle-theft report signal.

6 Claims, 4 Drawing Sheets

ANTI-THEFT SYSTEM FOR VEHICLES

BACKGROUND OF THE INVENTION

1. Field of the Invention

The present invention relates to an anti-theft system for vehicles.

2. Description of the Related Art

These days, vehicle theft in which a criminal drives away with a parked vehicle is often reported. Particularly, the farther away stolen vehicles are from the location of the theft, the more difficult it is to locate the vehicles and they are rarely retrieved and returned to the owners.

In way of preventing such a vehicle theft, the iris or a finger print of the proper driver of a vehicle is registered beforehand and when the iris or finger print of a driver who actually drives the vehicle differs from that of the registrant, the engine cannot be started.

This system, however, causes some inconveniences, for example, the detection of the iris or finger print of a registered driver is required all the time, not just at the time of vehicle theft, and no drivers other than the registrant can drive the vehicle.

OBJECTS AND SUMMARY OF THE INVENTION

The present invention has been accomplished in view of the above problems and provides an anti-theft system for vehicles which is easy to operate and is capable of helping an owner recover a stolen vehicle.

According to the present invention, there is provided an anti-theft system for vehicles, comprising vehicle-theft reporting means for reporting that a vehicle has been stolen; an anti-theft service center for sending a theft signal to the stolen vehicle in response to that report; and an anti-theft apparatus, mounted on the vehicle, for inhibiting an engine of the vehicle from restarting in response to reception of the theft signal.

DETAILED DESCRIPTION OF THE PREFERRED EMBODIMENTS

A preferred embodiment of the present invention will now be described referring to the accompanying drawings.

Figure 1:
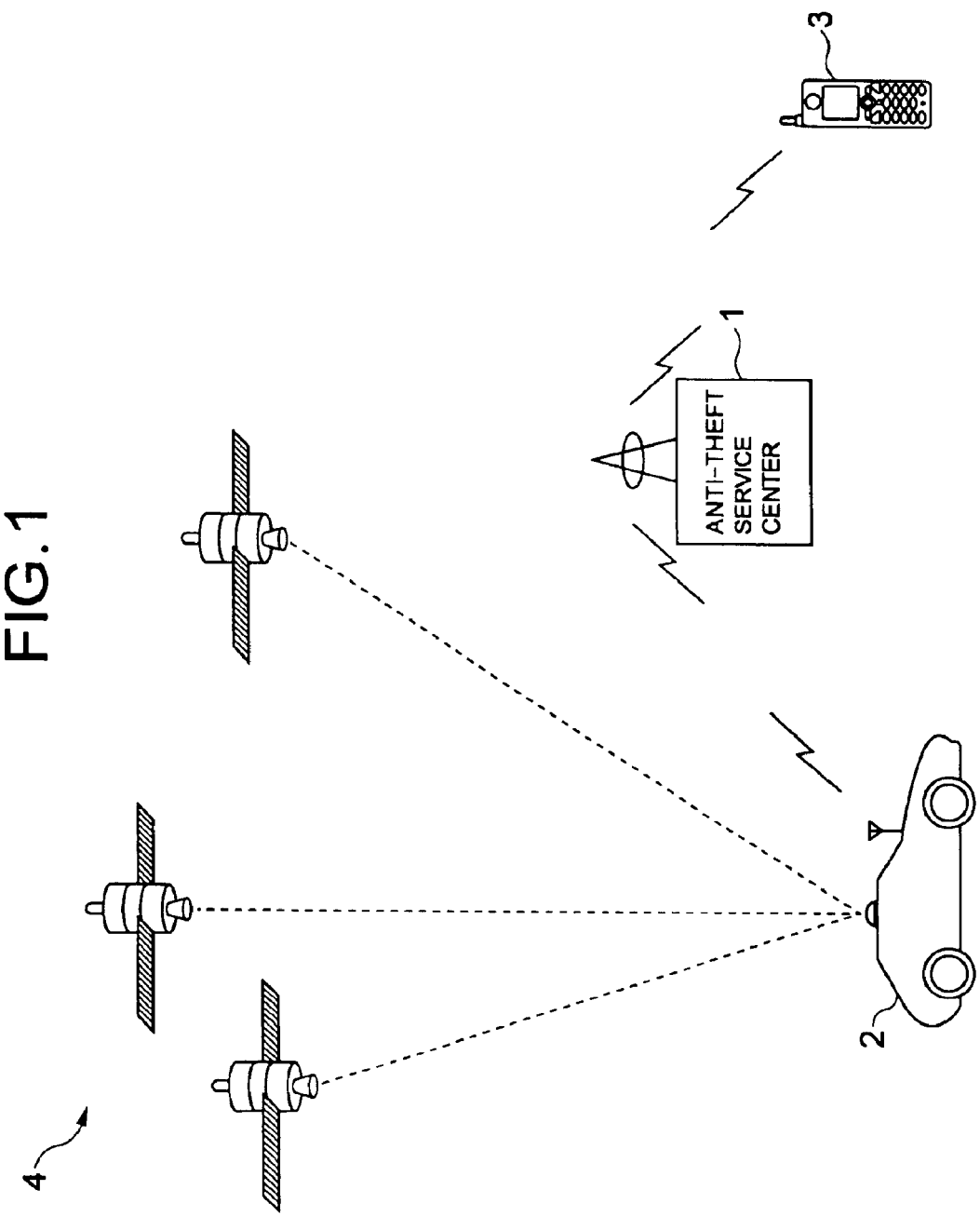
FIG. 1 is a general view of an anti-theft system for vehicles according to the present invention.

FIG. 1 is a general view of an anti-theft system for vehicles according to the invention.

As shown in FIG. 1, the anti-theft system for vehicles comprises an anti-theft service center 1, a vehicle 2, a cellular phone 3 owned by the owner of the vehicle 2 and GPS (Global Positioning System) satellites 4.

The anti-theft service center 1 is managed by, for example, a cellular phone company or the like and provides cellular-phone subscribers with an anti-theft service for vehicles to be discussed later. Before receiving the anti-theft service for vehicles, each cellular-phone subscriber (the owner of each cellular phone 3) needs to make a request to the anti-theft service center 1 for the user registration of the vehicle 2. The anti-theft service center 1 assigns a specific data communication channel to the registered vehicle and registers the channel in a database (not shown) in association with a cellular-phone subscriber ID of the cellular phone 3.

In case the registered vehicle 2 is stolen, the registered user for the anti-theft service for vehicles service reports the vehicle theft to the anti-theft service center 1 using the user's own cellular phone 3. Note that the cellular phone 3 can perform various types of data communication and telephone communication by using a subscriber switching circuit operated by the cellular phone company. In response to the report of the vehicle theft from the cellular phone user via the cellular phone 3, the anti-theft service center 1 reports the vehicle theft and the present location of the stolen vehicle 2 to the police and sends a theft signal to the stolen vehicle 2.

Figure 2:
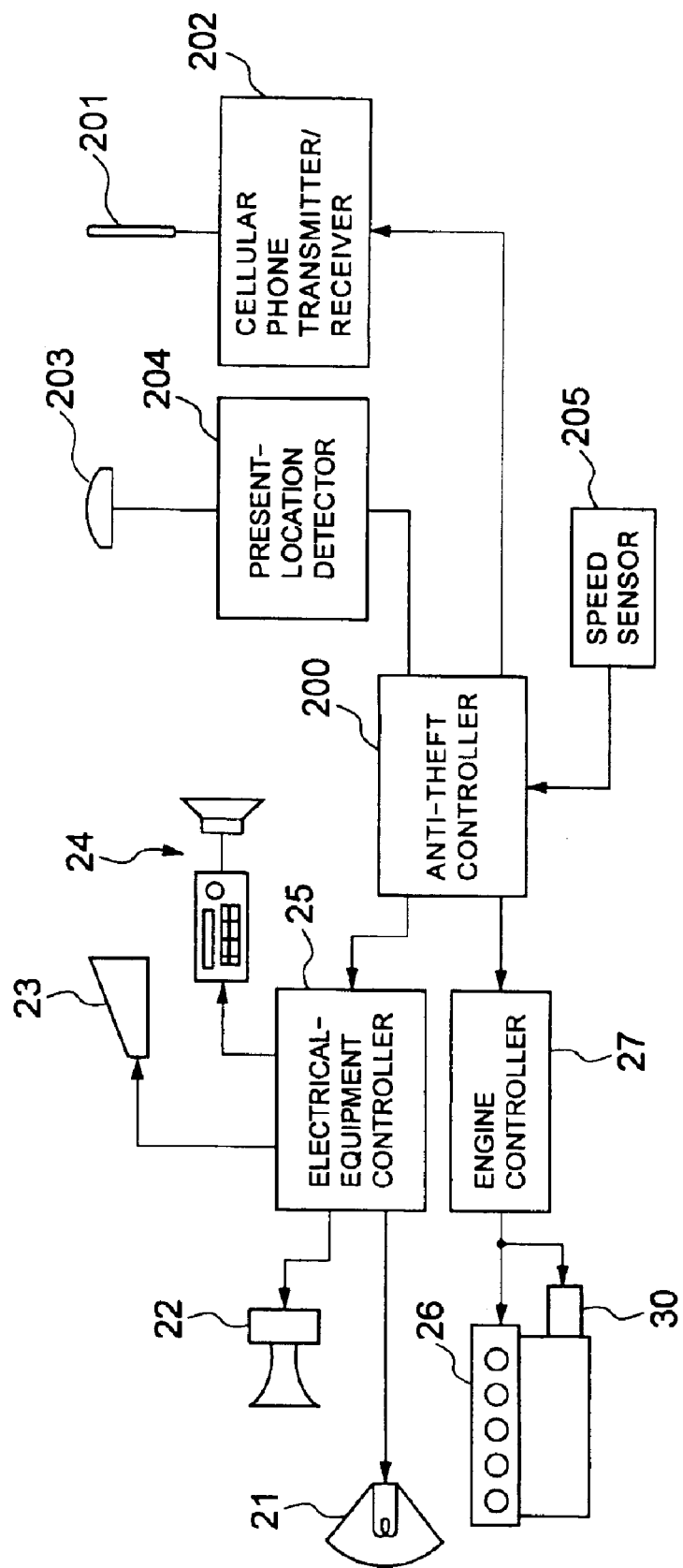
FIG. 2 is a diagram illustrating the internal constitution of a vehicle 2 related to the anti-theft system according to the present invention.

As shown in FIG. 2, the vehicle 2 has various lights (headlights, taillights, blinkers, reverse lights) 21 and a horn 22 mounted thereon as exterior components. Further, a display unit 23 and an in-vehicle audio system 24 are installed in the vehicle 2 as interior components. An electrical-equipment controller 25 performs light-ON/OFF control of the various lights 21, horn sounding control of the horn 22, display control of the display unit 23 and music or other audio play control of the in-vehicle audio system 24 in accordance with the manual operation by the driver. When receiving a theft warning signal from an anti-theft controller 200, the electrical-equipment controller 25 automatically controls the exterior components and interior components to function in a theft warning mode (which will be discussed later).

As shown in FIG. 2, the vehicle 2 is equipped with an engine controller 27 which controls an engine 26.

The vehicle 2 is also equipped with the anti-theft controller 200, a cellular phone antenna 201, a cellular phone transmitter/receiver 202, a GPS antenna 203, a present-location detector 204 and a speed sensor 205, which are essential components of the anti-theft system for vehicles of the present invention.

The speed sensor 205 detects the speed of the vehicle 2 and supplies the anti-theft controller 200 with vehicle speed information indicating the vehicle speed. The present-location detector 204 detects the present location of the vehicle 2 based on a radio signal received from any GPS satellite 4 via the GPS antenna 203 and supplies the anti-theft controller 200 with the vehicle's positional information indicating the present location. When receiving the theft signal from the anti-theft service center 1 via the cellular phone antenna 201, the cellular phone transmitter/receiver 202 sends the theft signal to the anti-theft controller 200. When receiving the vehicle's positional information from the anti-theft controller 200, the cellular phone transmitter/receiver 202 sends this information to the anti-theft service center 1 via the cellular phone antenna 201.

Figure 3:
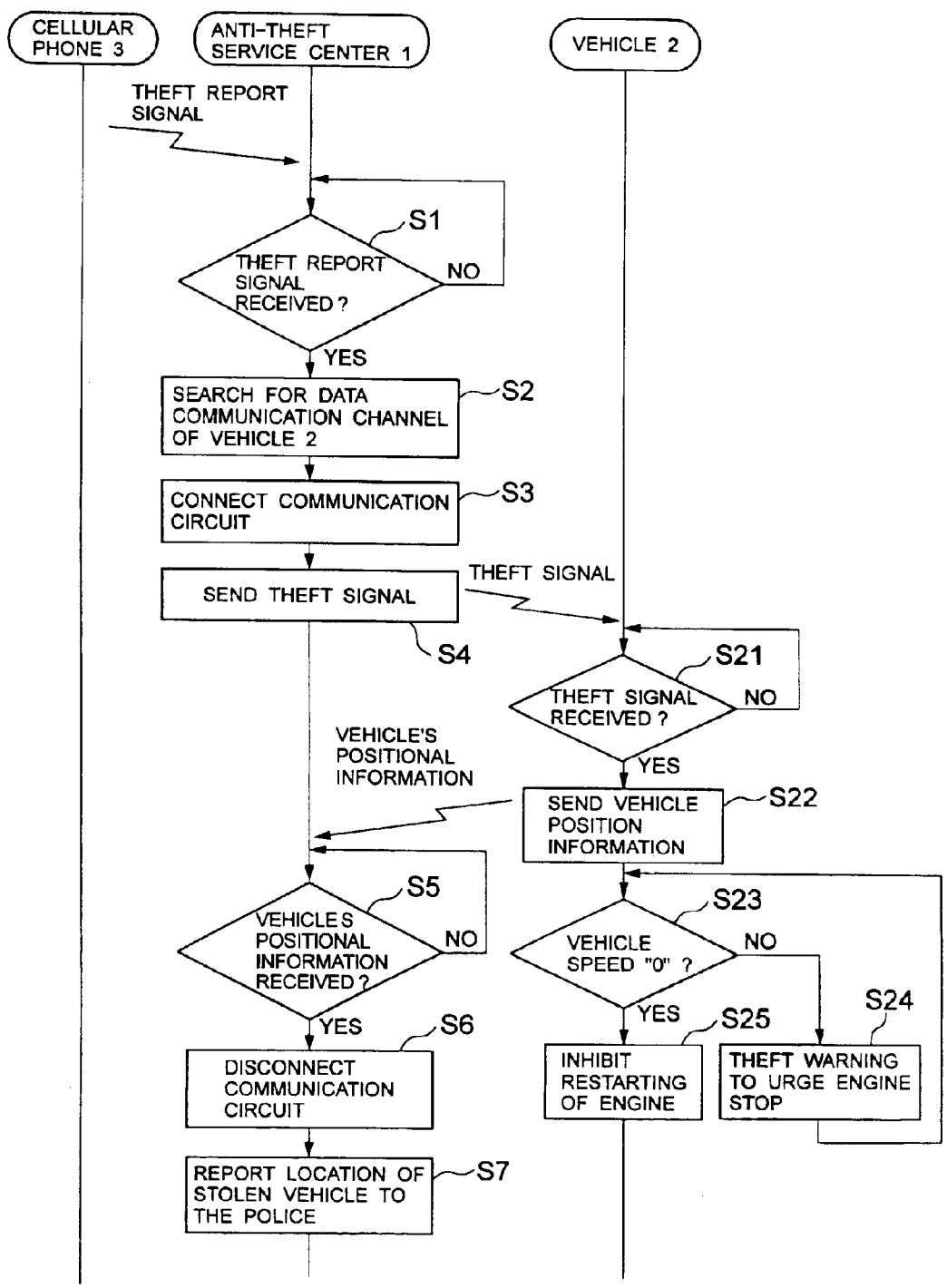
FIG. 3 is a diagram for explaining the operation of the anti-theft system according to the present invention.

FIG. 3 is a diagram illustrating the operation of the anti-theft system shown in FIG. 1.

When the vehicle 2 protected by the anti-theft service for vehicles is stolen, the registered user inputs a theft occurrence code indicating the occurrence of a vehicle theft to his or her cellular phone 3. In response to the code, the cellular phone 3 generates a theft report signal and sends the signal to the anti-theft service center 1 as shown in FIG. 3.

During this period, the anti-theft service center 1 makes a decision on whether or not it has received the theft report signal when it receives the theft report signal (step S1) as shown in FIG. 3. When it is determined in step S1 that the theft report signal has been received, the anti-theft service center 1 searches the database for the data communication channel of the vehicle 2 corresponding to the subscriber ID of the cellular phone 3 that has sent the theft report signal (step S2). Then, the anti-theft service center 1 connects the communication line to the data communication channel (step S3) and sends a theft signal (step S4). That is, executing the step S4, the anti-theft service center 1 sends the theft signal only to the stolen vehicle 2.

The anti-theft controller 200 of the vehicle 2 makes a decision on whether or not it has received the theft signal from the anti-theft service center 1 when it receives the theft signal (step S21). When it is determined in step S21 that the theft signal has been received, the anti-theft controller 200 supplies the cellular phone transmitter/receiver 202 with the vehicle's positional information sent from the present-location detector 204 (step S22). In the execution of the step S22, the cellular phone transmitter/receiver 202 sends the vehicle's positional information to the anti-theft service center 1.

The anti-theft service center 1 makes a decision on whether or not it has received the vehicle's positional information sent from the vehicle 2 when it receives the vehicle's positional information (step S5). When it is determined in step S5 that the vehicle's positional information has been received, the anti-theft service center 1 disconnects the data communication line from the vehicle 2 (step S6). Then, the anti-theft service center 1 reports to the police the occurrence of a vehicle theft together with the received vehicle's positional information or information indicating the present location of the stolen vehicle 2 (step S7).

While the anti-theft service center 1 performs the sequence of operations (steps S6 and S7), the anti-theft controller 200 of the vehicle 2 determines whether or not the vehicle speed information supplied from the speed sensor 205 indicates the speed of "0" (step S23). When it is determined in step S23 that the vehicle speed information does not indicate the speed of "0" or that the vehicle 2 is moving, the anti-theft controller 200 generates a theft warning signal and sends the signal to the electrical-equipment controller 25 (step S24). In response to the theft warning signal, the electrical-equipment controller 25 changes to the theft warning mode and executes the following control on the lights 21, the horn 22, the display unit 23 and the in-vehicle audio system 24.

In response to the theft warning signal, the electrical-equipment controller 25 sends a horn signal to the horn 22 to continuously sound the horn and sends a passing signal to the lights 21 to blink all the lights 21. In response to the theft warning signal, the electrical-equipment controller 25 further supplies the display unit 23 with a warning display command to display a warning message, such as "Turn off the engine! Turning the engine off stops honking (blinking of the lights)". In response to the theft warning signal, the electrical-equipment controller 25 also sends a warning voice command to the in-vehicle audio system 24 to generate an audio warning message in voices. After executing the step S24, the anti-theft controller 200 returns to execute the step S23 and repeats the above-described sequence of operations.

While the vehicle 2 is running, according to the steps S23 and S24, the horn 22 keeps honking and the lights 21 including the headlights, taillights, indicators and reverse lights to repeat blinking at the same time. Further, a warning message to urge the thief to stop the engine, such as "Turn off the engine! Turning off the engine stops honking (blinking of the lights)", is displayed on the display and the warning message is given repeatedly from speakers of in-vehicle audio system 24. This operation urges a thief to stop the vehicle 2.

When it is determined in the step S23 that the vehicle speed information indicates the speed of "0" or that the vehicle 2 is not in motion, on the other hand, the anti-theft controller 200 sends an engine-restart inhibition command to the engine controller 27 (step S25). In response to the engine-restart inhibition command, the engine controller 27 sets the engine 26 in a state where it is impossible to restart. For example, the engine controller 27 should set a restart inhibition flag in a routine program which is run every engine cycle to set a fuel injection amount $T_{out}$ in a fuel injection device of the engine 26 so that $T_{out}$ is set to "0". Setting the fuel injection amount to "0" forcibly sets the engine 26 in the state where the restart is inhibited. Alternatively, in response to the engine-restart inhibition command, the engine controller 27 may send a power-cutoff pulse signal having a predetermined pulse sequence to a starter motor 30 to cut off the power supply to the starter motor 30 that starts the engine 26.

Figure 4:
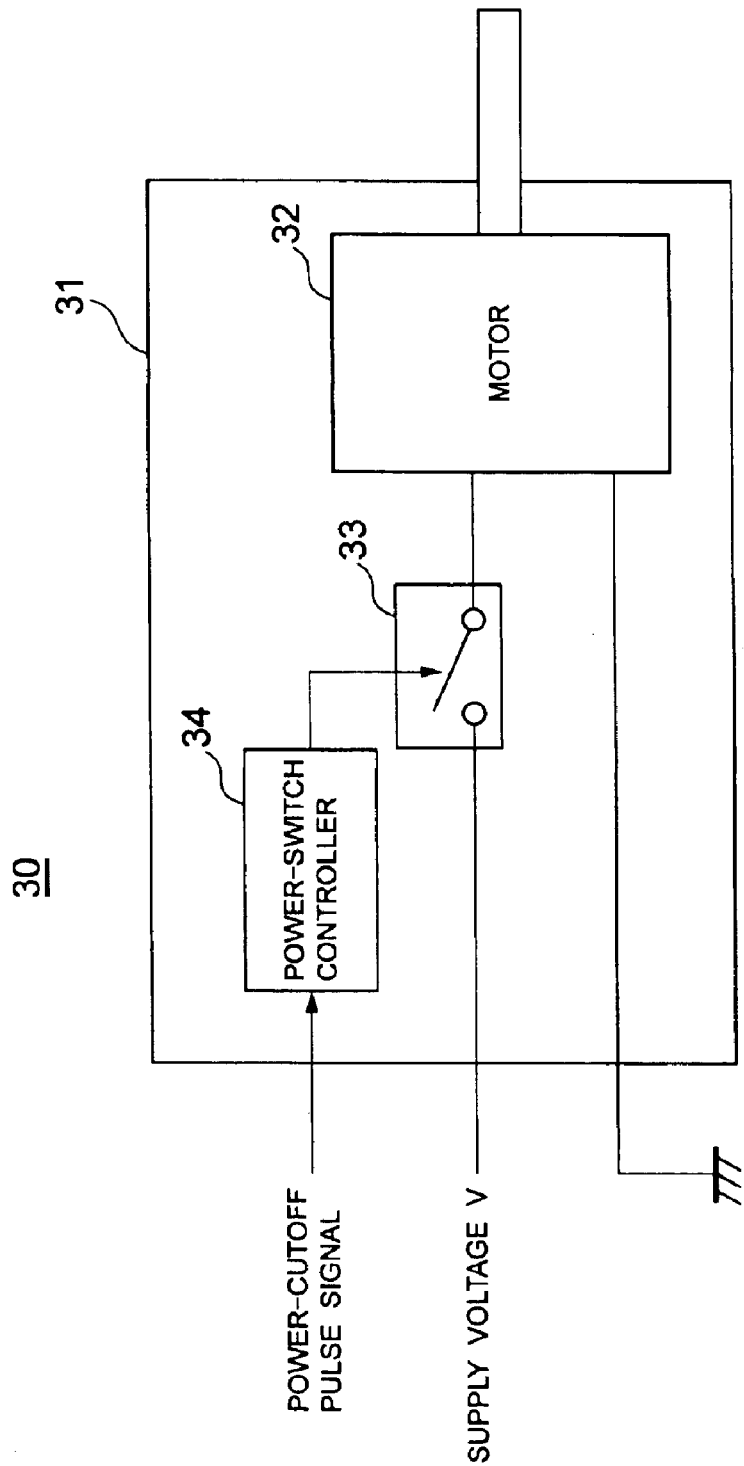
FIG. 4 is a diagram showing the internal constitution of a starter motor 30.

FIG. 4 is a diagram showing the internal structure of the starter motor 30.

Referring to FIG. 4, a casing 31 of the starter motor 30 houses a motor 32, a power switch 33 for cutting off the supply of a power supply voltage V to the motor 32 and a power-switch controller 34. The power-switch controller 34 supplies the power switch 33 with a switch signal which holds the power switch 33 off only when the power-cutoff pulse signal having a predetermined pulse sequence is supplied. Since the power supply voltage V is not supplied to the motor 32 during that period, the motor 32 does not run even if a driver turns the ignition key, that is, the engine 26 cannot be started.

When the vehicle 2 is not in motion, the execution of the step S25 sets the engine 26 in the state where it is impossible to restart so as to prevent a thief from driving the vehicle 2 away.

Although the engine 26 is set in the state where it is impossible to restart only when the vehicle 2 is not in motion in the above-described embodiment, the engine 26 may be remote-controlled to be put in the state where it is impossible to restart while the vehicle 2 is moving at a safe speed enough.

In the embodiment, the theft report signal sent from the cellular phone 3 in response to the input of the theft occurrence code reports a vehicle theft to the anti-theft service center 1. Alternatively, a registered user may speak over the cellular phone 3 to report a vehicle theft to an operator at the anti-theft service center 1. At this time, upon reception of the vehicle theft report, the operator at the anti-theft service center 1 manually executes a sequence of operations of the steps S2 to S4 in FIG. 3 one after another.

In short, the anti-theft system for vehicles according to the invention remotely controls a stolen vehicle in such a way as to inhibit the engine from restarting in response to a vehicle-theft report, thereby preventing a thief from driving the vehicle away himself.

The present invention can therefore ensure prevention of vehicle theft by allowing stolen vehicles to be recovered through an easy operation.

This application is based on a Japanese Patent Application No. 2000-246254 which is hereby incorporated by reference.

What is claimed is:

1. An anti-theft system for vehicles, comprising:

vehicle registration system having a plurality of communication channels respectively assigned to subscriber IDs;

vehicle-theft notifying devices each for notifying that a vehicle has been stolen;

an anti-theft service center for receiving a notice from one of said vehicle-theft notifying devices and for sending a theft signal through one of the communication channels corresponding to the subscriber ID of said one of the vehicle-theft notifying devices to the stolen vehicle in response to the notice and reporting theft of said stolen vehicle to authorities; and an anti-theft apparatus, mounted on said vehicle, for inhibiting an engine of said vehicle from restarting in response to reception of said theft signal.

2. The anti-theft system for vehicles according to claim 1, wherein said anti-theft apparatus inhibits said engine of said vehicle from restarting in response to reception of said theft signal only when said vehicle is stopped.

3. The anti-theft system for vehicles according to claim 1, wherein said anti-theft apparatus blinks lights of said vehicle and continually sounds a horn of said vehicle in response to reception of said theft signal when said vehicle is in motion.

4. The anti-theft system for vehicles according to claim 1, wherein said anti-theft apparatus gives an audio-and-visual warning to a driver of said vehicle to stop said vehicle in response to reception of said theft signal when said vehicle is moving.

5. The anti-theft system according to claim 1, wherein said anti-theft apparatus includes present-location detecting means for detecting a present-location of said vehicle and generating vehicle positional information, and sends vehicle positional information to said anti-theft service center in response to reception of said theft signal.

6. The anti-theft system according to claim 1, wherein said vehicle-theft notifying device is a cellular phone which generates a theft report signal and sends said theft report signal to said anti-theft service center in response to an input of a theft occurrence code.

* * * * *